US012598322B2

(12) United States Patent
Oh et al.

(10) Patent No.: US 12,598,322 B2
(45) Date of Patent: Apr. 7, 2026

(54) IMAGE PROCESSING APPARATUS USING NEURAL NETWORK AND IMAGE PROCESSING METHOD USING THE SAME

(71) Applicant: SAMSUNG ELECTRONICS CO., LTD., Suwon-si (KR)

(72) Inventors: Paul Oh, Suwon-si (KR); Seung Hoon Jee, Suwon-si (KR); Young Hun Sung, Suwon-si (KR); Jung Yeop Yang, Suwon-si (KR); Do Kwan Oh, Suwon-si (KR); Jun Hee Lee, Suwon-si (KR); Dong Won Jang, Suwon-si (KR); Jong Seong Choi, Suwon-si (KR); Chan Sol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/654,604

(22) Filed: May 3, 2024

(65) Prior Publication Data

US 2025/0159232 A1     May 15, 2025

(30) Foreign Application Priority Data

Nov. 15, 2023     (KR) ........................ 10-2023-0157984

(51) Int. Cl.
*H04N 19/513*          (2014.01)
*G06V 10/82*          (2022.01)
(Continued)

(52) U.S. Cl.
CPC ........... *H04N 19/513* (2014.11); *G06V 10/82* (2022.01); *H04N 19/117* (2014.11);
(Continued)

(58) Field of Classification Search
None
See application file for complete search history.

(56) References Cited

U.S. PATENT DOCUMENTS 11,586,930 B2     2/2023   Meng et al.
2018/0124425 A1*   5/2018   Van Leuven .......... H04N 19/53
(Continued)

FOREIGN PATENT DOCUMENTS

CN          111723812 A      9/2020
CN          114708646 A      7/2022
(Continued)

OTHER PUBLICATIONS

James, Jerin Geo et al., "GlobalFlowNet: Video Stabilization using Deep Distilled Global Motion Estimates", arXiv:2210.13769v3 [cs.CV], Nov. 4, 2022. (10 pages total).
(Continued)

*Primary Examiner* — Jessica M Prince
(74) *Attorney, Agent, or Firm* — Sughrue Mion, PLLC

(57) ABSTRACT
An image encoding apparatus may include a memory storing one or more instructions; and a processor configured to execute the one or more instructions to: obtain an initial search position from a student neural network that has been trained through a knowledge distillation from a teacher neural network by inputting a current frame and a reference frame to the student neural network; and perform motion estimation based on the initial search position.

18 Claims, 13 Drawing Sheets

(51) Int. Cl.

| | |
|---|---|
| *H04N 19/117* | (2014.01) |
| *H04N 19/124* | (2014.01) |
| *H04N 19/176* | (2014.01) |
| *H04N 19/18* | (2014.01) |
| *H04N 19/91* | (2014.01) |

(52) U.S. Cl.
   CPC ......... *H04N 19/124* (2014.11); *H04N 19/176* (2014.11); *H04N 19/18* (2014.11); *H04N 19/91* (2014.11)

(56) References Cited

U.S. PATENT DOCUMENTS

| | | | |
|---|---|---|---|
| 2020/0012940 A1* | 1/2020 | Liu | ...................... G06T 3/4007 |
| 2020/0125927 A1 | 4/2020 | Kim | |
| 2022/0101537 A1* | 3/2022 | Sun | ...................... G06T 3/4046 |
| 2022/0116622 A1* | 4/2022 | Possos | ................. H04N 19/137 |
| 2023/0030020 A1* | 2/2023 | Li | ...................... H04N 19/172 |
| 2024/0412382 A1* | 12/2024 | Jee | ...................... H04N 19/56 |

FOREIGN PATENT DOCUMENTS

| | | |
|---|---|---|
| CN | 116320458 A | 6/2023 |
| KR | 10-2020-0045128 A | 5/2020 |
| KR | 10-2023-0046269 A | 4/2023 |
| KR | 10-2023-0058133 A | 5/2023 |
| WO | 2023/055153 A1 | 4/2023 |

OTHER PUBLICATIONS

Lin, Ye et al., "Weight Distillation: Transferring the Knowledge in Neural Network Parameters", Proceedings of the 59th Annual Meeting of the Association for Computational Linguistics and the 11th International Joint Conference on Natural Language Processing, pp. 2076-2088, Aug. 1-6, 2021. (13 pages total).

* cited by examiner

START

RECEIVE AND PARSE BITSTREAM ⟋1010

OUTPUT TRANSFORM COEFFICIENT ⟋1020

OBTAIN RESIDUAL BLOCK ⟋1030

GENERATE PREDICTED BLOCK ⟋1040

GENERATE RECONSTRUCTED BLOCK ⟋1050

APPLYING FILTERING AND OUTPUT IMAGE ⟋1060

END

IMAGE PROCESSING APPARATUS USING NEURAL NETWORK AND IMAGE PROCESSING METHOD USING THE SAME

CROSS-REFERENCE TO RELATED APPLICATION(S)

This application claims priority to Korean Patent Application No. 10-2023-0157984, filed on Nov. 15, 2023, in the Korean Intellectual Property Office, the disclosure of which is incorporated herein by reference in its entirety.

BACKGROUND

Field

Apparatuses and methods consistent with embodiments of the present disclosure relate to a neural network-based image processing and optimizing an initial search position for motion estimation in the image processing.

Description of Related Art

With the advancement of information and communication technology, the capturing, storage, and sharing of images have become diverse and active. In particular, the use of mobile and portable devices to capture and store images has increased, resulting in the need for image signal processing to eliminate physical degradation, or codec technology for efficient storage and transmission.

Image signal processing or codec for video processing involves estimating the inter-frame correlation in a sequence of images, referred to as an image stream, to enhance the quality of the video or compress the correlation for storage and transmission at lower capacity. The inter-frame correlation is based on motion estimation (ME) between images according to the unit within the image to be processed, for example, patch or block.

In hardware codecs, instead of employing a full search to estimate the optimal motion to minimize computing or time resources during motion estimation, motion that satisfies a rate-distortion cost determined by each hardware is selected.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of the present disclosure, an image encoding apparatus may include: a memory storing one or more instructions; and a processor configured to execute the one or more instructions to: obtain an initial search position from a student neural network that has been trained through a knowledge distillation from a teacher neural network by inputting a current frame and a reference frame to the student neural network; and perform motion estimation based on the initial search position.

The student neural network may be trained by inputting a first frame and a second frame into the teacher neural network to obtain a first initial search position, inputting the first frame and the second frame into the student neural network to obtain a second initial search position, and training the student neural network based on a loss function using a difference between the first initial search position and the second initial search position.

The loss function may include a multiplication of the difference between the first initial search position and the second initial search position by a loss weight.

The loss weight may be determined based on bitrate increasing rate information acquired by the teacher neural network.

The bitrate increasing rate information may be obtained by comparing an image compression result with the first initial search position applied and an image compression result without applying the first initial search position.

The processor may be further configured to output a predicted frame by performing motion compensation based on result of the motion estimation.

The teacher neural network may be located within the image encoding apparatus, or an external device located outside the image encoding apparatus.

There are a plurality of teacher neural networks including the teacher neural network. The student neural network may be trained by inputting a first frame and a second frame into each of the plurality of teacher neural networks, obtaining a plurality of initial search positions from the plurality of teacher neural networks, inputting the first frame and the second frame into the student neural network, obtaining the initial search position from the student neural network, and train the student neural network based on a loss function using differences between the plurality of initial search positions from the plurality of teacher neural networks and the initial search position from the student neural network.

The loss function may include a computation of a difference between the first initial search position and a ground truth label.

According to another aspect of the present disclosure, an image encoding method may include: outputting an initial search position from a student neural network by inputting a current frame and a reference frame of an image into the student neural network that has been trained through a knowledge distillation from a teacher neural network; and performing motion estimation based on the initial search position.

The outputting of the initial search position may include: obtaining a first initial search position from the teacher neural network by inputting a first frame and a second frame, into the teacher neural network; obtaining a second initial search position from the student neural network by inputting the first frame and the second frame into the student neural network; and training the student neural network based on a loss function using a difference between the first initial search position and the second initial search position.

The loss function may include a multiplication of the difference between the first initial search position and the second initial search position by a loss weight.

The image encoding method may further include: generating the loss weight based on bitrate increasing rate information acquired by the teacher neural network.

The image encoding method may further include: obtaining the bitrate increasing rate information by comparing an image compression result of the student neural network with the first initial search position applied and an image compression result of the student neural network without applying the first initial search position.

The image encoding method may further include outputting a predicted frame by performing motion compensation based on result of the motion estimation.

The loss function may include a computation of a difference between the first initial search position and a ground truth label.

In another aspect of the disclosure, there is provided an image decoding apparatus including an entropy decoder configured to receive a bitstream and parse the received bitstream to obtain information necessary for image reconstruction, an inverse quantizer configured to output a transform coefficient by inversely quantizing a quantized transform coefficient contained in the information, an inverse transformer configured to obtain a residual block by inversely transforming the transform coefficient, a predictor configured to generate a predicted block on the basis of information on prediction obtained from the entropy decoder, an adder configured to generate a reconstructed block by adding the residual block and the predicted block, and a filter configured to apply filtering to the reconstructed block, wherein the bitstream may be an encoded image signal based on a motion vector obtained using an initial search position output by inputting a current frame and a reference frame into a student neural network trained through a knowledge distillation technique using a teacher neural network.

In another aspect of the disclosure, there is provided an image decoding method including receiving a bitstream and parsing the received bitstream to obtain information necessary for image reconstruction, outputting a transform coefficient by inversely quantizing a quantized transform coefficient contained in the information, obtaining a residual block by inversely transforming the transform coefficient, generating a predicted block on the basis of information on prediction obtained from an entropy decoder, generating a reconstructed block by adding the residual block and the predicted block, and applying filtering to the reconstructed block, wherein the bitstream may be an encoded image signal based on a motion vector obtained using an initial search position output by inputting a current frame and a reference frame into a student neural network trained through a knowledge distillation technique using a teacher neural network.

According to another aspect of the disclosure, there is provided a non-transitory computer-readable storage medium storing a program that is executable by a processor to perform an image encoding method. The image encoding method may include: outputting an initial search position from a student neural network by inputting a current frame and a reference frame of an image into the student neural network that has been trained through a knowledge distillation from a teacher neural network; and performing motion estimation based on the initial search position.

The non-transitory computer-readable storage medium may further include: obtaining a bitrate increasing rate by comparing an image compression result of the student neural network using a teacher's initial search position obtained from the teacher neural network and an image compression result of the student neural network without using the teacher's initial search position; and updating network parameters of the student neural network based on a loss function using the bitrate increasing rate as a loss weight.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
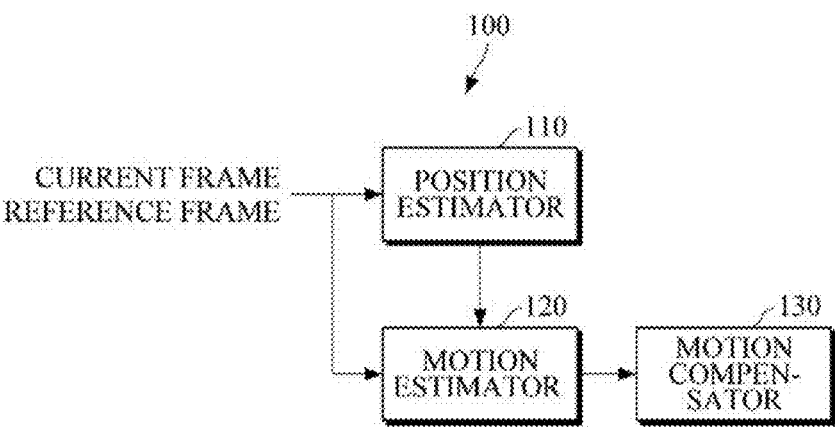
FIG. 1 is a block diagram illustrating an image encoding apparatus according to an embodiment.

Reference will now be made in detail to embodiments, examples of which are illustrated in the accompanying drawings. Advantages and features of the present invention and methods of achieving the same will become apparent with reference to the embodiments described in detail below with reference to the accompanying drawings. Like reference numerals refer to like elements throughout the specification.

Terms such as first, second, and the like may be used to describe various elements, but the elements should not be limited to those terms. These terms may be used for the purpose of distinguishing one element from another element. The singular forms are intended to include the plural forms as well, unless the context clearly indicates otherwise. It will be further understood that when an element is referred to as "comprising" or "including" another element, the element is intended not to exclude one or more other elements, but to further include one or more other elements, unless explicitly described to the contrary. The term used in the embodiments such as "unit" or "module" indicates a unit for processing at least one function or operation, and may be implemented in hardware, software, or in a combination of hardware and software.

Further, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

FIG. 1 is a block diagram illustrating an image encoding apparatus according to an embodiment.

An image encoding apparatus may perform the encoding of an image, and the image may refer to a single frame constituting a video, or the video itself. For example, image encoding may involve encoding an entire video or encoding one frame among the frames constituting the video.

Referring to FIG. 1, an image encoding apparatus 100 may include a position estimator 110, a motion estimator 120, and a motion compensator 130.

The position estimator 110 and the motion estimator 120 may be implemented as separate hardware or software modules, or the position estimator 110 may be implemented as an integrated module within the motion estimator 120. For example, the motion estimator 120 may be implemented as part of the configuration within the image encoding apparatus 100, and the position estimator 110 may be implemented separately from the image encoding apparatus 100 and operated as a preprocessor in front of the image encoding apparatus 100.

The position estimator 110 may receive an image captured from a camera and/or an inertial measurement unit, estimate the initial search position (ISP) for motion estimation of the image, and provide information on the estimated initial search position to the motion estimator 120.

The motion estimator 120 may perform motion estimation based on the estimated initial search position provided by the position estimator 110. Motion estimation involves the process of finding a block in a reference frame similar to a block to be compressed in a current frame. For example, the motion estimator 120 may start searching for a block similar to the one to be compressed in the current frame from the initial search position of the reference frame. In this case, the reference frame may be not only a frame preceding the current frame in time but also a frame following the current frame.

The motion compensator 130 may perform motion compensation based on the result of motion estimation and output a predicted frame. For example, the motion compensator 130 may output a predicted frame by compensating for the difference between the estimated similar block and the block to be compressed.

Typically, in hardware codecs, instead of estimating the optimal motion through a full search during motion estimation, motion that satisfies the rate-distortion cost determined by each hardware is selected. This allows them to operate quickly in less memory under the same standard, but it comes with the drawback of a relatively lower compression rate compared to software codecs.

To enhance the compression rate performance for images, accurate motion estimation is crucial. Utilizing a trained neural network to determine the optimal initial search position (e.g., the position closest to the block within the reference frame that is most similar to the block to be compressed) may improve the accuracy of motion estimation with fewer computations, and may, in turn, enhance the compression rate and quality of the image.

The position estimator 110 may determine the initial search position using a knowledge distillation technique that employs both a teacher neural network and a student neural network. For example, the position estimator 110 may output the initial search position by inputting the current frame and the reference frame into a student neural network trained through a knowledge distillation technique using a teacher neural network. Through the training process, network parameters of the student neural network may be updated to minimize or converge the loss of the student neural network. The network parameters may include weights and biases applied to neurons of the student neural network.

Knowledge distillation refers to the process of acquiring essential knowledge from a larger model (e.g., a teacher neural network) and transferring it to a smaller model (e.g., a student neural network). It is a method to reduce the size of a model for lightweight purposes.

The position estimator 110 may train a student neural network by utilizing the knowledge (e.g., a predicted value of the initial search position) from a teacher neural network, and may perform an inference process of estimating an initial motion search position via the trained neural network. The teacher neural network is large in size and extensively trained, compared to the student neural network, which is a lightweight model. The position estimator 110 may minimize the error energy between the predicted frame and the current frame by decreasing the amount of difference or discrepancy between the predicted frame and the actual (current) frame, and therefore may enhance compression rate performance. Depending on an embodiment, the position estimate 110 may employ the pre-trained student neural network to perform the inference process, instead of performing the training process.

Figure 2:
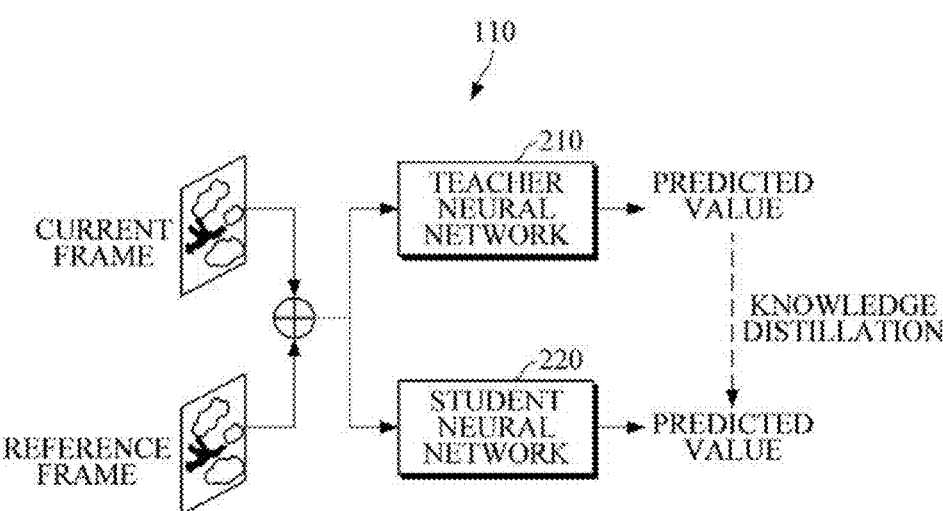
FIG. 2 is a diagram illustrating a neural network-based position estimator and training of the position estimator using a knowledge distillation technique according to an embodiment.

FIG. 2 is a diagram illustrating a neural network-based position estimator and training of the position estimator using a knowledge distillation technique according to an embodiment.

Referring to FIG. 2, the position estimator 110 may include a teacher neural network 210 and a student neural network 220.

The teacher neural network 210 may be located within the position estimator 110 and perform real-time learning along with a learning neural network and conduct real-time knowledge distillation. The teacher neural network 210 may be implemented as a separate hardware or software module.

The student neural network 220 may be trained through a knowledge distillation technique based on output results of the teacher neural network 210. The current frame and the reference frame may be input to the trained student neural network 220, which may output a final initial search position. The output initial search position may then be transmitted to the motion estimator.

To train the student neural network using the knowledge distillation technique, the position estimator 110 may input a plurality of first and second frames, which are pre-stored in a storage unit, into the teacher neural network 210 to output a first initial search position, input the first frames and the second frames into the student neural network 220 to output a second initial search position, determine a loss function based on the output first and second initial search positions, and train the student neural network by applying the determined loss function thereto.

In this process, the storage unit may contain various scenes included in a database (DB). The stored first and second frames may be a pair stored as a dataset for learning, and may correspond to the current frame and the reference frame, respectively.

In this case, the loss function may be represented by Equation 1 below:

$$L_{kd}(mv_t, mv_s) = \sum_{i \in DB} w(i) \cdot |mv_t(i) - mv_s(i)| \quad (1)$$

Here, $mv_t$ represents a motion vector that is a predicted value of the initial search position output by the teacher neural network 210, $mv_s$ represents a motion vector that is a predicted value of the initial search position output by the student neural network 220, and $L_{kd}$ represents the loss function.

The position estimator 110 may determine the loss function by multiplying the difference between the first initial search position and the second initial search position by a loss weight w(i). The loss weight w(i) may determine the degree of reflection of the difference between the first initial search position and the second initial search position, and may be generated based on bitrate increasing rate information obtained using the first initial search position acquired from the teacher neural network, and may be determined according to Equation 2 below:

$$W(i) = \begin{cases} -BDBR(i) + \tau + k & \text{if } BDBR(i) < \tau \\ k & \text{else} \end{cases} \quad (2)$$

Here, Bjontegaard delta bitrate (BDBR) represents bitrate increasing rate information, $\tau$ denotes a predetermined threshold, and K denotes an offset value.

According to Equation 2, when the compression rate improves, BDBR appears as a negative value, so the loss weight w (i) may increase proportionally to the negative value of BDBR. $\tau$ is a predetermined threshold (e.g., -1), and the loss weight w(i) may be greater than the offset k (e.g., 0) if BDBR based on the prediction result of the teacher neural network is superior to $\tau$ in terms of compression rate. If k is 0, only the prediction result of the teacher neural network with superior BDBR to t during training may distill knowledge from the teacher neural network to the student neural network. The student neural network, through knowledge distillation, i.e. receiving the knowledge (e.g., BDBR) from the teacher neural network, may be trained such that the loss function is minimized.

In this process, the bitrate increasing rate information may be obtained by comparing a compression result with the first initial search position applied and a compression result without applying the first initial search position.

Figure 3A:
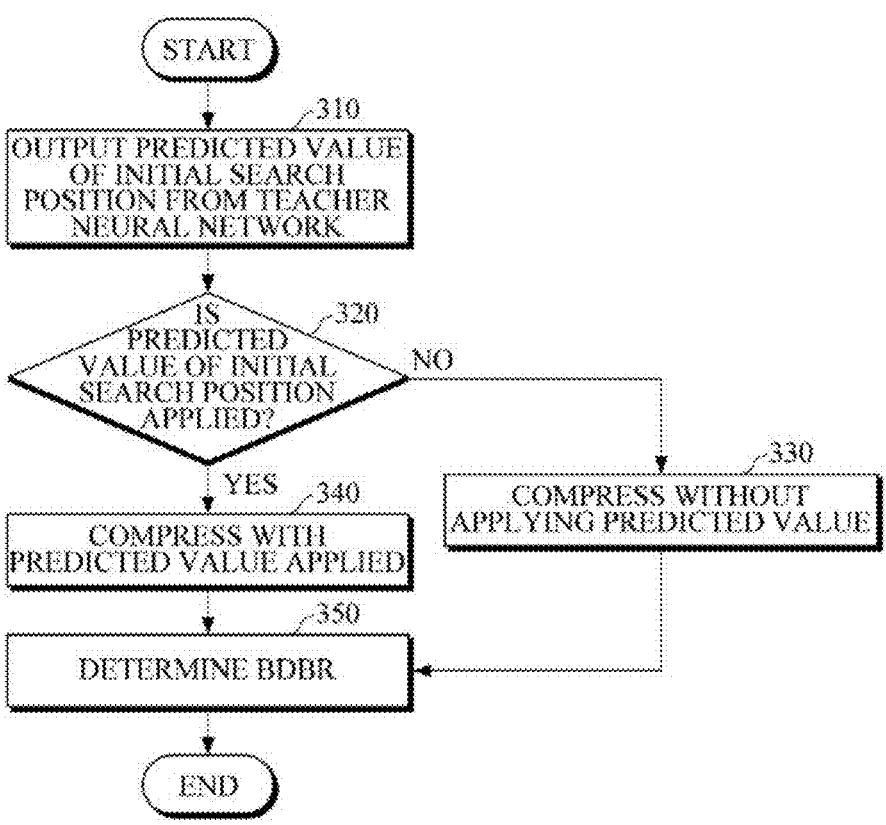
FIG. 3A is a flowchart of determining bitrate increasing rate information technique according to an embodiment.
Figure 3B:
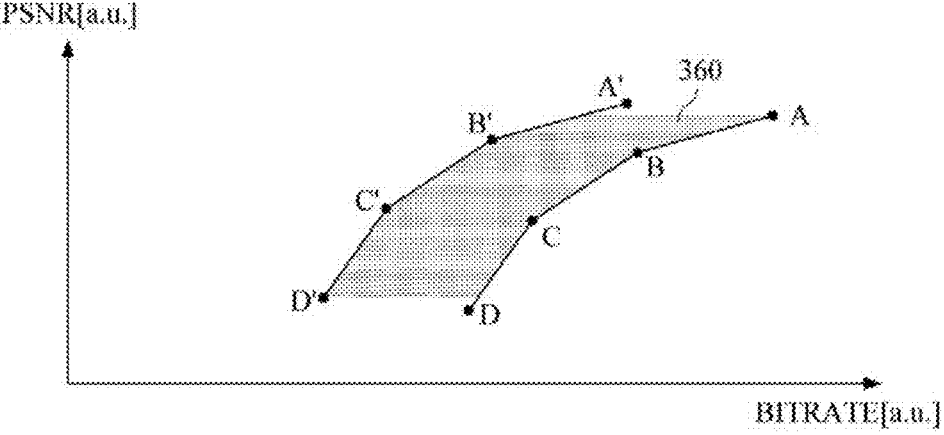
FIG. 3B is a graph for describing bitrate increasing rate information technique according to an embodiment.

FIG. 3A is a flowchart of determining bitrate increasing rate information, and FIG. 3B is a graph for describing bitrate increasing rate information.

Referring to FIG. 3A, for example, a pre-trained teacher neural network outputs a predicted value of the initial search position by inputting the first frame and the second frame in operation 310. Depending on whether the predicted value of the initial search position is applied in operation 320, an image encoding apparatus performs compression for, for example, target quantization parameters (QPs) of 22, 27, 32, and 37, respectively, without applying the predicted value of the initial search position in operation 330, and it performs compression for the same target QPs of 22, 27, 32, and 37, respectively, with the predicted value of the initial search position applied in operation 340. Subsequently, BDBR may be determined based on bitrate and or peak signal-to-noise ratio (PSNR) results when the predicted value of the initial search position is applied and when it is not applied in operation 350.

FIG. 3B shows a compression performance graph including A, B, C, and D that represent compression results for QPs of 22, 27, 32, and 37, respectively, without applying the predicted value of the initial search position. FIG. 3B shows another compression performance graph including A', B', C', and D' that represent compression results for the same QPs with the application of the predicted initial search position. In this case, BDBR may be represented by the area under the lines connecting A, B, C, and D and the area under the lines connecting A', B', C', and D.' Referring to FIG. 3B, the area under the lines connecting A', B', C', and D' is larger than the area under the lines connecting A, B, C, and D by an area difference 360. The larger area indicates a higher BDBR, showing improvement in the compression rate.

Below, Table 1 compares BDBR when employing the knowledge distillation technique and when not employing it.

TABLE 1

| BDBR | Teacher neural network | Student neural network Without knowledge distillation | Student neural network With knowledge distillation |
|---|---|---|---|
| Inter4k total sequences (149,314 frames) | -0.76372 | -0.65019 | -0.74141 |
| Inter4k dynamic sequences (20,589 frames) | -6.14523 | -5.41112 | -6.01393 |

A test set is Inter4k dataset, and the BDBR of a teacher neural network pre-trained on 149,314 frames is compared with a student neural network that is not subjected to knowledge distillation and a student neural network trained through knowledge distillation. Additionally, BDBR is similarly compared for dynamic sequences within the Inter4K dataset where the effects of the initial search position can be significantly observed.

Referring to Table 1, it can be seen that the BDBR of the student neural network trained through knowledge distillation is relatively similar to the BDBR of the teacher neural network, indicating relatively superior neural network performance compared to the student neural network without knowledge distillation.

Figure 4:
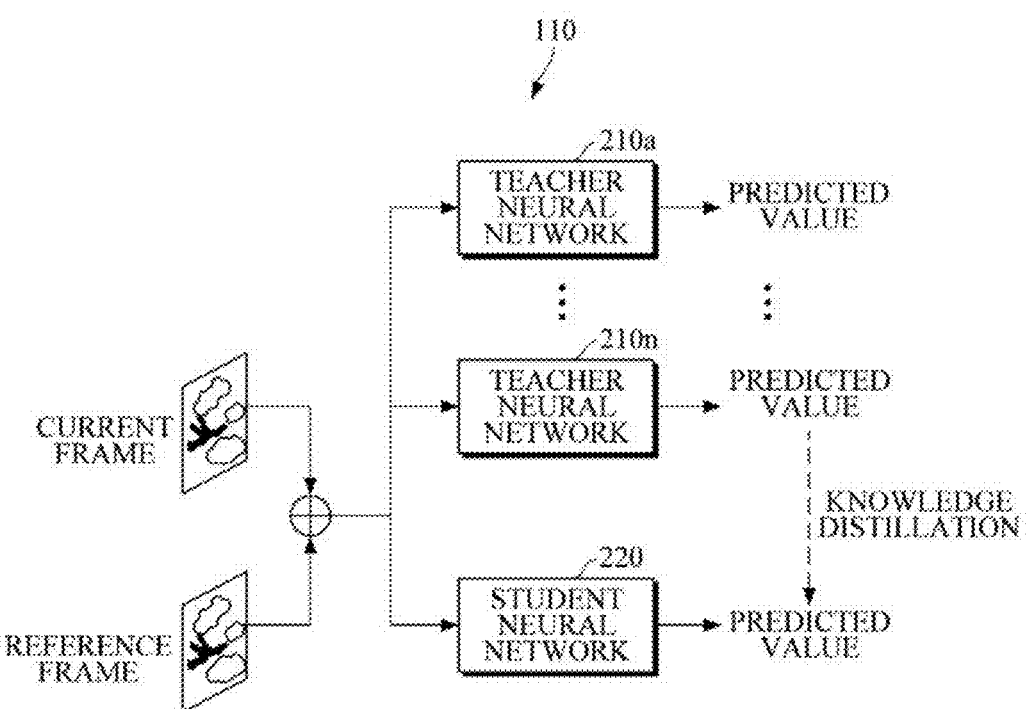
FIG. 4 is a diagram illustrating a neural network-based position estimator and training of the position estimator using a knowledge distillation technique according to an embodiment.

FIG. 4 is a diagram illustrating a neural network-based position estimator and training of the position estimator using a knowledge distillation technique according to an embodiment.

Referring to FIG. 4, there may be a plurality of teacher neural networks 210a, . . . and, 210n, and a position estimator may determine a loss function based on a plurality of initial search positions, which are output by inputting a first frame and a second frame, stored in a storage unit, into each teacher neural network, and an initial search position output by inputting the first frame and the second frame into a student neural network, and may train the student neural network by applying the determined loss function thereto. The corresponding loss function and weight may be expressed by Equations 3 and 4, respectively.

$$L_{kd}(mv_{t,1}, \dots, mv_{t,N}, mv_s) = \sum_{i \in DB} \sum_{n=1}^{N} W_n(i) \cdot |mv_{t,n}(i) - mv_s(i)| \quad (3)$$

$$W_n(i) = \begin{cases} -BDBR(i, n) + \tau + k & \text{if } BDBR(i, n) < \tau \\ k & \text{else} \end{cases} \quad (4)$$

Here, $mv_{t,1}, \ldots,$ and $mv_{t,N}$ each represent a motion vector that is a predicted value of an initial search position output by each of the teacher neural networks $210a, \ldots,$ and $210n$, and BDBR(i, n) represents a BDBR value by the nth teacher neural network.

Figure 5:
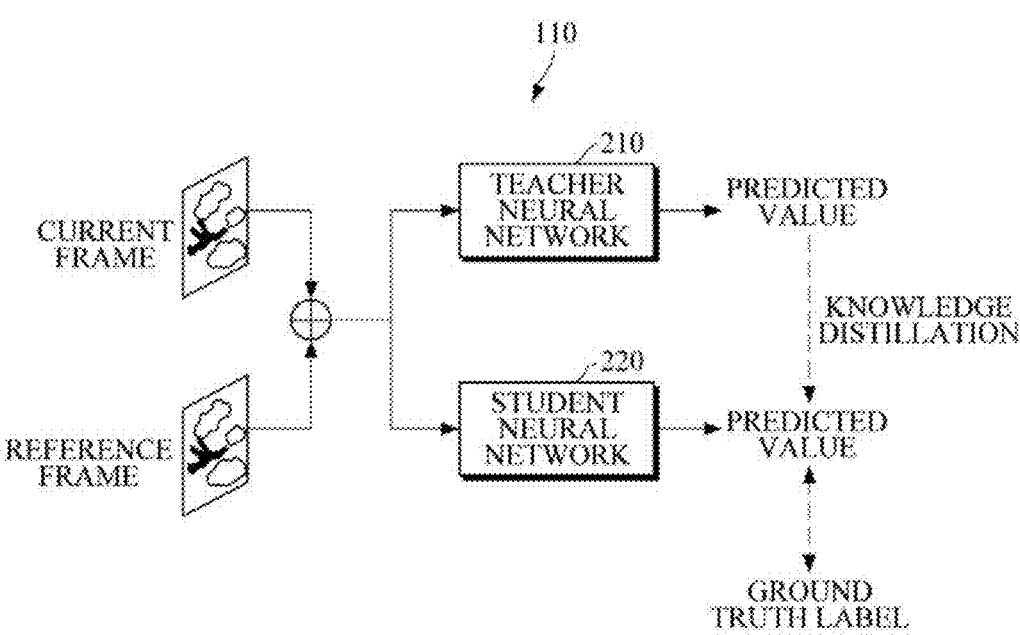
FIG. 5 is a diagram illustrating a neural network-based position estimator and training of the position estimator using a knowledge distillation technique according to an embodiment.

FIG. 5 is a diagram illustrating a neural network-based position estimator and training of the position estimator using a knowledge distillation technique according to an embodiment.

FIGS. 2 and 4 illustrate embodiments where the student neural network is trained using the predicted value of the initial search position of the teacher neural network in the absence of a ground truth label, whereas FIG. 5 illustrates an embodiment where the student neural network is trained additionally using the ground truth label stored in a storage unit.

$$L_t = \alpha L_{kd}(mv_t, mv_s) + L_{sl}(mv_l, mv_s) \tag{5}$$

In Equation 5, $L_t$ represents a final loss function, and $L_{kd}(mv_t, mv_s)$ represents the knowledge distillation loss in Equation 1. $L_{sl}(mv_l, mv_s)$ represents the loss between the ground truth label and the predicted value of the initial search position by the student neural network and may be expressed by Equation 6.

$$L_{sl}(mv_l, mv_s) = \sum_{i \in DB} |mv_l(i) - mv_s(i)| \tag{6}$$

Here, $mv_l$ represents a motion vector for the ground truth label and the scale factor $\alpha$ allows adjusting the proportion between the knowledge distillation loss and the loss between the aforementioned predicted values.

In real scenes, the initial search positions may vary between different hardware codecs and may also change based on the movement of objects and the camera in each scene. As a result, it becomes challenging to create a training database related to universal initial search positions across various scenes. Additionally, because the distribution of optimized initial search positions is uneven, training a neural network using conventional methods may lead to the network following the tendency of the unevenly distributed training data.

According to the above embodiment that utilizes knowledge distillation, creating loss weights based on BDBR information from the teacher neural network, and incorporating these loss weights into the loss function during training, the performance of the student neural network may be improved since the loss weights are reflected to allow the network to focus on learning predicted values of the initial search positions from the teacher neural network that have superior BDBR. Accordingly, the accuracy of motion estimation may be increased, leading to improved compression rate and quality in the image.

Figure 6:
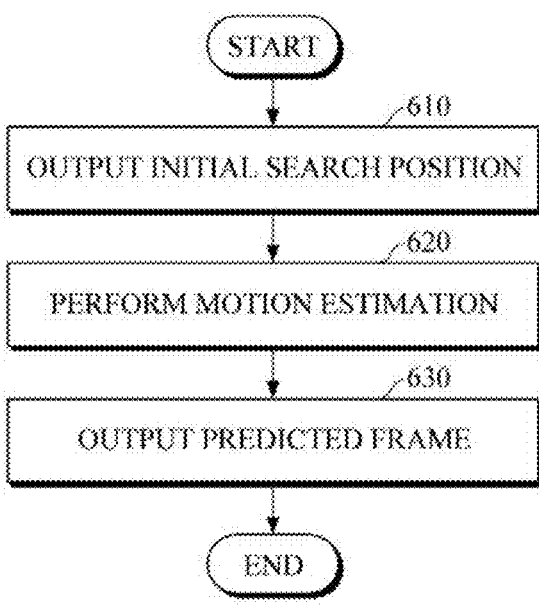
FIG. 6 is a flowchart illustrating an image encoding method according to an embodiment.

FIG. 6 is a flowchart illustrating an image encoding method according to an embodiment.

FIG. 6 illustrates an embodiment of an image encoding method performed by the aforementioned image encoding apparatus, which will be described in brief to avoid redundancy.

The image encoding apparatus may output an initial search position by inputting the current frame and the reference frame into a student neural network trained through a knowledge distillation technique using a teacher neural network in operation 610. Operation 610 will be described in further detail with reference to FIG. 7.

Figure 7:
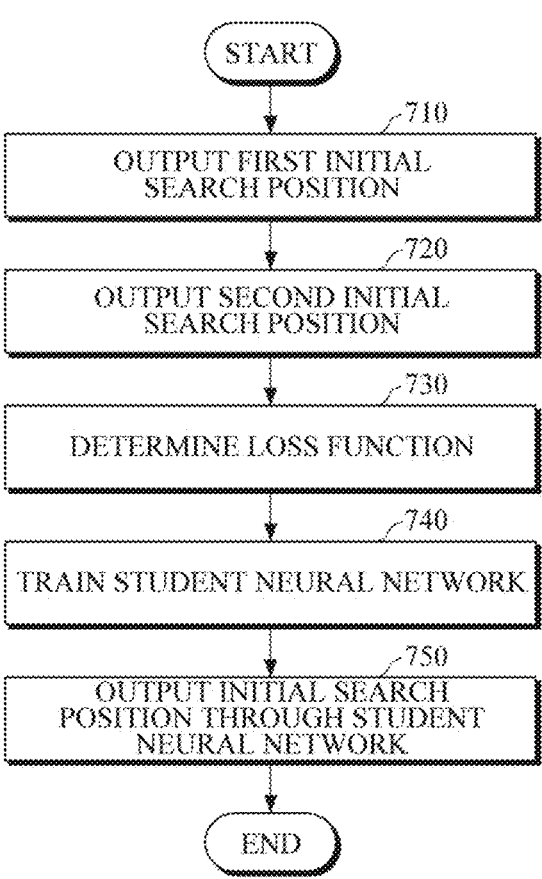
FIG. 7 is a flowchart illustrating a method of outputting an initial search position according to an embodiment.

FIG. 7 is a flowchart illustrating a method of outputting an initial search position according to an embodiment.

The image encoding apparatus may output a first initial search position by inputting a plurality of first and second frames, pre-stored in the storage unit, into the teacher neural network in operation 710, and may output a second initial search position by inputting the first and second frames into the student neural network in operation 720.

The image encoding apparatus may determine the loss function based on the output first and second initial search positions in operation 730. The loss function may be determined by multiplying the difference between the first initial search position and the second initial search position by a pre-determined loss weight. The pre-determined loss weight may be generated based on bitrate increasing rate information (i.e. BDBR) acquired by the teacher neural network. BDBR may be obtained by comparing a compression result using the first initial search position with a compression result without applying the first initial search position. Additionally, the image encoding apparatus may utilize not only the output first and second initial search positions but also the ground truth label stored in the storage unit to determine the loss function.

Subsequently, the determined loss function may be applied to train the student neural network in operation 740, and an initial search position may be output by inputting a current frame and a reference frame into the trained student neural network in operation 750.

Referring back to FIG. 6, the image encoding apparatus, based on the output initial search position, may perform motion estimation in operation 620, and may output a predicted frame by performing motion compensation based on the motion estimation result in operation 630.

Figure 8A:
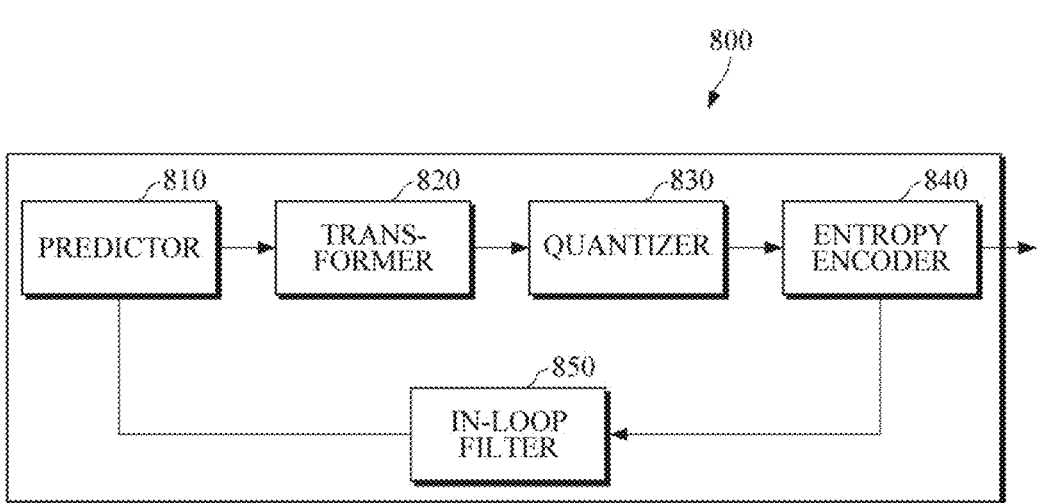
FIG. 8A is a block diagram illustrating an image encoding apparatus according to an embodiment.
Figure 8B:
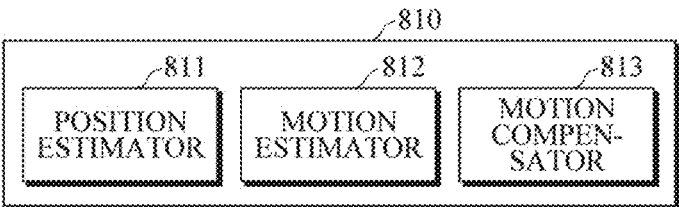
FIG. 8B is a block diagram illustrating a predictor included in an image encoding apparatus according to an embodiment.

FIG. 8A is a block diagram illustrating an image encoding apparatus according to an embodiment. FIG. 8B is a block diagram illustrating a predictor included in an image encoding apparatus according to an embodiment.

Referring to FIGS. 8A and 8B, an image encoding apparatus 800 may include a predictor 810, a transformer 820, a quantizer 830, an entropy encoder 840, and an in-loop filter 850. The image encoding apparatus 800 may include additional components in addition to those illustrated or omit some components.

The predictor 810 may perform a prediction for a block to be processed and generate a predicted block. When performing inter-prediction, the predictor 810 may include a position estimator 811 configured to output an initial search position, a motion estimator 812 configured to estimate motion based on the output initial search position, and a motion compensator 813 configured to output a predicted block by performing motion compensation on the basis of the motion estimation result.

In this case, the position estimator, which is a neural network-based position estimator, may output the initial search position by inputting the current frame and the reference frame into a student neural network trained through a knowledge distillation technique using a teacher neural network.

The transformer 820 may generate transform coefficients by applying a predetermined transformation technique (e.g., discrete cosine transform (DCT), discrete sine transform (DST), etc.) to a residual block generated by subtracting the predicted block from the original block, which is an input image signal.

The quantizer 830 may quantize these transform coefficients and transform them to the entropy encoder 840. The entropy encoder 840 may encode a signal related to the information of the quantized transform coefficients to output the encoded signal as a bitstream.

The in-loop filter 850 may apply filtering to the image resulting from the encoding process to restore compression degradation.

Figure 9:
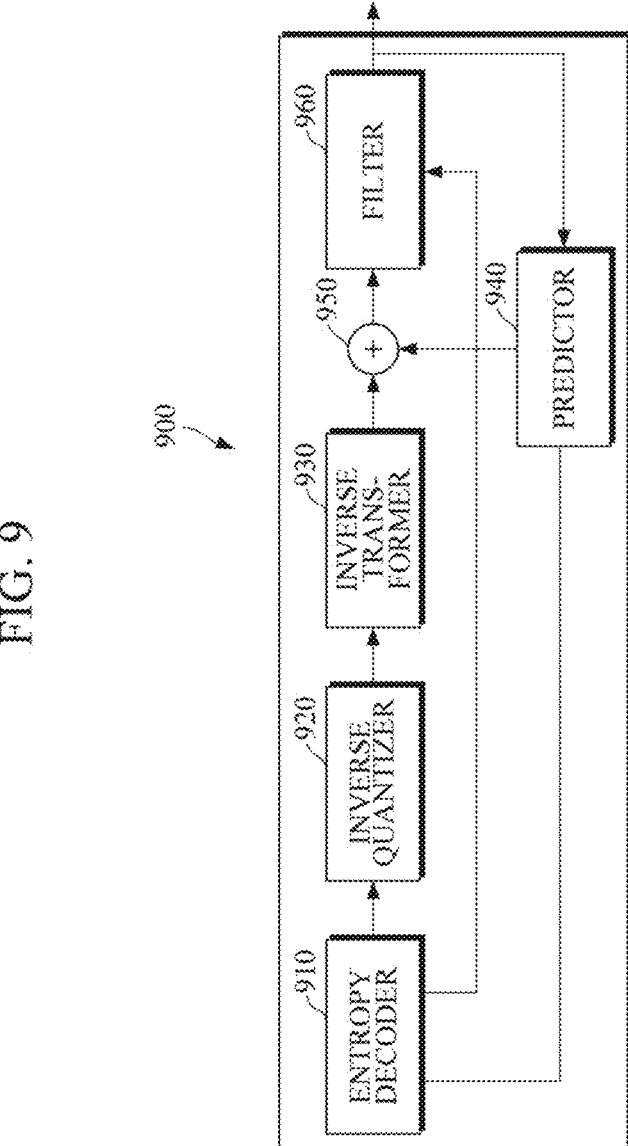
FIG. 9 is a block diagram illustrating an image decoding apparatus according to an embodiment.

FIG. 9 is a block diagram illustrating an image decoding apparatus according to an embodiment.

Referring to FIG. 9, an image decoding apparatus 900 may include an entropy decoder 910, an inverse quantizer 920, an inverse transformer 930, a predictor 940, an adder 950, and a filter 960. The image decoding apparatus 900 may include additional components in addition to those illustrated or omit some components.

The entropy decoder 910 may parse a received bitstream to extract information necessary for image reconstruction. Of the decoded information, information related to prediction may be provided to the predictor 940, quantized transform coefficients and related parameter information may be provided to the inverse quantizer 920, and information related to filtering may be provided to the filter 960.

The received bitstream may be an image signal that is encoded and generated in the form of a bitstream, based on a motion vector obtained using an initial search position output by inputting the current frame and the reference frame of the image into a student neural network trained through knowledge distillation using a teacher neural network.

The inverse quantizer 920 may inversely quantize the quantized transform coefficients and output the transform coefficients.

The inverse transformer 930 may obtain a residual block by inversely transforming the transform coefficients.

The predictor 940 may generate a predicted block based on information on the prediction output from the entropy decoder 910.

The adder 950 may generate a reconstructed block by adding the predicted block to the residual block acquired by the inverse transformer 930.

The filter 960 may enhance the image quality by applying filtering to the reconstructed block, and ultimately, output an image containing the filtered block.

Figure 10:
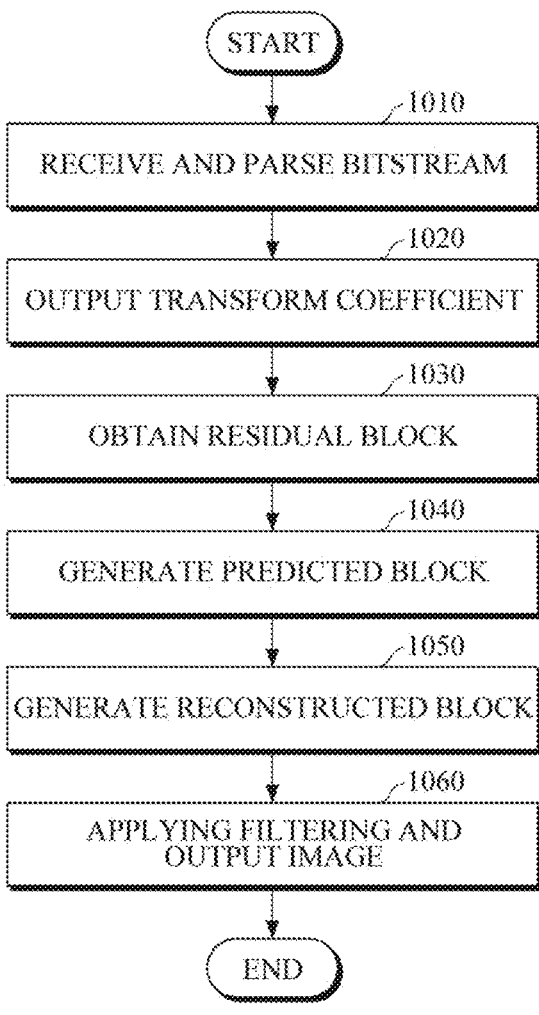
FIG. 10 is a flowchart illustrating an image decoding method according to an embodiment.

FIG. 10 is a flowchart illustrating an image decoding method according to an embodiment.

Referring to FIG. 10, an image decoding apparatus may receive a bitstream and parse it to obtain information necessary for image reconstruction in operation 1010. The bitstream may be an encoded image signal based on a motion vector obtained using an initial search position output by inputting a current frame and a reference frame into a student neural network trained through a knowledge distillation technique using a teacher neural network.

The image decoding apparatus may inversely quantize quantized transform coefficients contained in the information to output the transform coefficients in operation 1020.

The image decoding apparatus may inversely transform the transform coefficients to obtain a residual block in operation 1030.

The image decoding apparatus may generate a predicted block on the basis of information on the prediction obtained from an entropy decoder in operation 1040.

The image decoding apparatus may add the residual block and the predicted block to generate a reconstructed block in operation 1050 and apply filtering to the reconstructed block to output an image in operation 1060.

Figure 11:
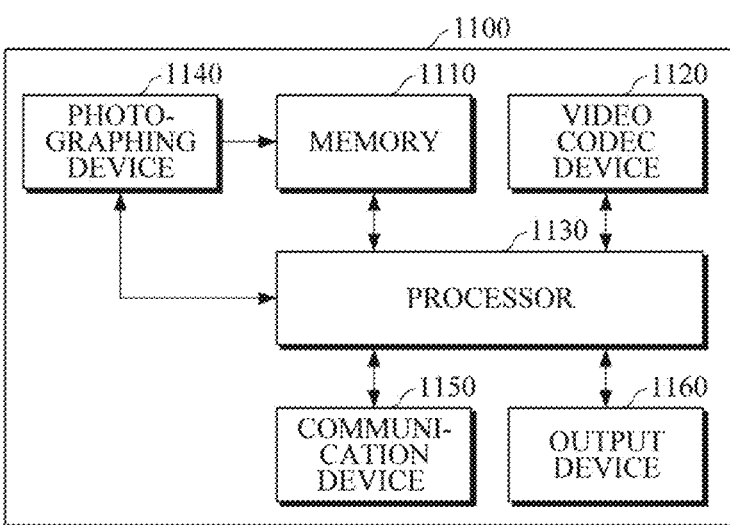
FIG. 11 is a block diagram illustrating an electronic device including a video codec device according to an embodiment.

FIG. 11 is a block diagram illustrating an electronic device including a video codec device according to an embodiment.

An electronic device 1100 may include devices such as edge devices that require applications to convert low-resolution images at low frame rates to high-resolution images at high frame rates in an environment with limited computing resources, various devices performing image transmission/reception, such as mobile phones, TVs, monitors, Internet of Things (IoT) devices, cloud computing devices, and the like.

Referring to FIG. 11, the electronic device 1100 may include memory 1110, a video codec device 1120, a processor 1130, a photographing device 1140, a communication device 1150, and an output device 1160. The electronic device 1100 may optionally exclude some or all of the photographing device 1140, the communication device 1150, and the output device 1160 as needed.

The memory 1110 may store commands executed by the processor 1130 for video learning and processing. Also, the memory 1110 may store neural networks, loss functions, a current frame, a reference frame, and the like for video processing. The memory 1110 may include random access memory (RAM), such as dynamic random access memory (DRAM) and static random access memory (SRAM), read-only memory (ROM), flash memory, cache memory, virtual memory, and the like. However, the memory is not limited to these examples.

The video codec device 1120 may include components of the above-described image encoding apparatus 100. For example, the video codec device 1120 may include a position estimator based on a student neural network, which is trained through a knowledge distillation technique using a teacher neural network, to output an initial search portion by inputting the current frame and the reference frame of an image, and a motion estimator configured to perform motion estimation based on the initial search position output from the position estimator.

The position estimator may input a first frame and a second frame, which are stored in a storage unit, into the teacher neural network to output a first initial search position, input the first and second frames into the student neural network to output a second initial search position, determine a loss function based on the output first and second initial search positions, and train the student neural network by applying the determined loss function thereto.

The position estimator may determine the loss function by multiplying the difference between the first initial search position and the second initial search position by a predetermined weight, and the pre-determined weight may be generated based on bitrate increasing rate information (i.e. BDBR) acquired by the teacher neural network.

The image encoding apparatus using the neural networks of the knowledge distillation technique may be used when compression is performed for streaming within an electronic device, such as a user terminal, or when a user captures moving images and compresses and stores the moving images within the electronic device.

The video codec device 1120 may be formed as a whole into a single hardware chip or software module, but is not limited thereto, and may be implemented partly in hardware and partly in software. The video codec device 1120 may be incorporated in to the processor 1130.

The processor 1130 may control the overall operation of the components of the electronic device 1100, including the video codec device 1120. The processor 1130 may execute commands stored in the memory 1110 to control the operation of components and may request video processing by forwarding a video stored in the memory 1110 to the video codec device 1120. Additionally, the processor 1130 may control the photographing device 1140 to acquire a video to be processed, control the communication device 1150 to transmit processing results to other electronic devices, and control the output device 1160 to provide the processing results to the user.

The photographing device 1140 may include a device, such as a camera or the like that captures still images and moving images. The photographing device 1140 may store the captured image in the memory 1110 and transmit it to the processor 1130. The photographing device 1140 may include a lens assembly with one or more lenses, an image sensor, an image signal processor, and/or a flash. The lens assembly included in the camera module may collect light emitted from an object which is a target for image capture.

The communication device 1150 may establish a direct (wired) communication channel and/or a wireless communication channel between the electronic device 1100 and another electronic device, a server, or the sensor device in a network environment using various communication technologies, and may support communication through the established communication channel. The communication device 1150 may transmit an image (still image or moving image) captured by the photographing device 1140 and/or data (e.g., compressed video images, video-decoded images, etc.) processed by the processor 1130 to another electronic device. Additionally, the communication device 1150 may receive a video to be processed from cloud or another electronic device and store the received video in the memory 1110.

The output device 1160 may visually or non-visually output the image captured by the photographing device 1140 and/or data processed by the processor 1130. The output device 1160 may include an audio output device, a display device (e.g., a display), an audio module, and/or a haptic module. Results generated from the video codec device 1120 or processed results from the processor 1130 may be displayed on a screen.

The electronic device 1100 may further include a sensor device (e.g., an acceleration sensor, a gyroscope, a magnetic field sensor, a proximity sensor, a light sensor, a fingerprint sensor, etc.) configured to detect various data and an input device (e.g., a microphone, a mouse, a keyboard, a digital pen (stylus pen), etc.) configured to receive commands and/or data from the user.

The current embodiments can be implemented by computer readable code stored on a non-transitory computer readable medium. The computer readable medium includes all types of recording media in which computer readable data are stored.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image encoding apparatus comprising:
a memory storing one or more instructions; and
a processor configured to execute the one or more instructions to:
obtain an initial search position from a student neural network that has been trained through a knowledge distillation from a teacher neural network by inputting a current frame and a reference frame to the student neural network; and
perform motion estimation based on the initial search position,
wherein the student neural network is trained by inputting a first frame and a second frame into the teacher neural network to obtain a first initial search position, inputting the first frame and the second frame into the student neural network to obtain a second initial search position, and training the student neural network based on a loss function using a difference between the first initial search position and the second initial search position.

2. The image encoding apparatus of claim 1, wherein the loss function comprises a multiplication of the difference between the first initial search position and the second initial search position by a loss weight.

3. The image encoding apparatus of claim 2, wherein the loss weight is determined based on bitrate increasing rate information acquired by the teacher neural network.

4. The image encoding apparatus of claim 3, wherein the bitrate increasing rate information is obtained by comparing an image compression result with the first initial search position applied and an image compression result without applying the first initial search position.

5. The image encoding apparatus of claim 1, wherein the processor is further configured to output a predicted frame by performing motion compensation based on result of the motion estimation.

6. The image encoding apparatus of claim 1, wherein the teacher neural network is located within the image encoding apparatus, or an external device located outside the image encoding apparatus.

7. The image encoding apparatus of claim 1, wherein there are a plurality of teacher neural networks comprising the teacher neural network, and
the student neural network is trained by inputting the first frame and the second frame into each of the plurality of teacher neural networks, obtaining a plurality of initial search positions from the plurality of teacher neural networks, inputting the first frame and the second frame into the student neural network, obtaining the initial search position from the student neural network, and train the student neural network based on the loss function using differences between the plurality of initial search positions from the plurality of teacher neural networks and the initial search position from the student neural network.

8. The image encoding apparatus of claim 1, wherein the loss function comprises a computation of a difference between the first initial search position and a ground truth label.

9. An image encoding method comprising:

outputting an initial search position from a student neural network by inputting a current frame and a reference frame of an image into the student neural network that has been trained through a knowledge distillation from a teacher neural network; and performing motion estimation based on the initial search position, wherein the outputting of the initial search position comprises:

obtaining a first initial search position from the teacher neural network by inputting a first frame and a second frame, into the teacher neural network;

obtaining a second initial search position from the student neural network by inputting the first frame and the second frame into the student neural network; and training the student neural network based on a loss function using a difference between the first initial search position and the second initial search position.

10. The image encoding method of claim 9, wherein the loss function comprises a multiplication of the difference between the first initial search position and the second initial search position by a loss weight.

11. The image encoding method of claim 10, further comprising:

generating the loss weight based on bitrate increasing rate information acquired by the teacher neural network.

12. The image encoding method of claim 11, further comprising:

obtaining the bitrate increasing rate information by comparing an image compression result of the student neural network with the first initial search position applied and an image compression result of the student neural network without applying the first initial search position.

13. The image encoding method of claim 9, further comprising outputting a predicted frame by performing motion compensation based on result of the motion estimation.

14. The image encoding method of claim 9, wherein the loss function comprises a computation of a difference between the first initial search position and a ground truth label.

15. An image decoding apparatus comprising:

an entropy decoder configured to receive a bitstream and parse the received bitstream to obtain information necessary for image reconstruction;

an inverse quantizer configured to output a transform coefficient by inversely quantizing a quantized transform coefficient contained in the information;

an inverse transformer configured to obtain a residual block by inversely transforming the transform coefficient;

a predictor configured to generate a predicted block on the basis of information on prediction obtained from the entropy decoder;

an adder configured to generate a reconstructed block by adding the residual block and the predicted block; and a filter configured to apply filtering to the reconstructed block, wherein the bitstream is an encoded image signal based on a motion vector obtained using an initial search position output by inputting a current frame and a reference frame into a student neural network trained through a knowledge distillation technique using a teacher neural network, and wherein the student neural network is trained by inputting a first frame and a second frame into the teacher neural network to obtain a first initial search position, inputting the first frame and the second frame into the student neural network to obtain a second initial search position, and training the student neural network based on a loss function using a difference between the first initial search position and the second initial search position.

16. An image decoding method comprising:

receiving a bitstream and parsing the received bitstream to obtain information necessary for image reconstruction;

outputting a transform coefficient by inversely quantizing a quantized transform coefficient contained in the information;

obtaining a residual block by inversely transforming the transform coefficient;

generating a predicted block on the basis of information on prediction obtained from an entropy decoder;

generating a reconstructed block by adding the residual block and the predicted block; and applying filtering to the reconstructed block, wherein the bitstream is an encoded image signal based on a motion vector obtained using an initial search position output by inputting a current frame and a reference frame into a student neural network trained through a knowledge distillation technique using a teacher neural network, and wherein the student neural network is trained by inputting a first frame and a second frame into the teacher neural network to obtain a first initial search position, inputting the first frame and the second frame into the student neural network to obtain a second initial search position, and training the student neural network based on a loss function using a difference between the first initial search position and the second initial search position.

17. A non-transitory computer-readable storage medium storing a program that is executable by a processor to perform an image encoding method comprising:

outputting an initial search position from a student neural network by inputting a current frame and a reference frame of an image into the student neural network that has been trained through a knowledge distillation from a teacher neural network; and performing motion estimation based on the initial search position, wherein the student neural network is trained by inputting a first frame and a second frame into the teacher neural network to obtain a first initial search position, inputting the first frame and the second frame into the student neural network to obtain a second initial search position, and training the student neural network based on a loss function using a difference between the first initial search position and the second initial search position.

18. The non-transitory computer-readable storage medium of claim 17, further comprising:

obtaining a bitrate increasing rate by comparing an image compression result of the student neural network using a teacher's initial search position obtained from the teacher neural network and an image compression result of the student neural network without using the teacher's initial search position; and updating network parameters of the student neural network based on the loss function using the bitrate increasing rate as a loss weight.

\* \* \* \* \*